(12) United States Patent
Feustel

(10) Patent No.: US 6,678,766 B1
(45) Date of Patent: Jan. 13, 2004

(54) SYNCHRONOUS COMMUNICATION BUS AND PROCESS FOR SYNCHRONOUS COMMUNICATION BETWEEN CIRCUIT MODULES

(75) Inventor: Michael Feustel, Neustadt (DE)

(73) Assignee: SICAN GmbH, Hannover (DE)

( * ) Notice: Subject to any disclaimer, the term of this patent is extended or adjusted under 35 U.S.C. 154(b) by 574 days.

(21) Appl. No.: 09/602,446

(22) Filed: Jun. 23, 2000

(30) Foreign Application Priority Data

Jun. 26, 1999 (DE) .......................................... 199 29 419

(51) Int. Cl.[7] .............................................. G06F 13/00
(52) U.S. Cl. ........................ 710/100; 709/400; 712/40
(58) Field of Search .......................... 709/400; 710/22, 710/48, 51, 100, 260, 305; 711/100; 712/38, 40

(56) References Cited

U.S. PATENT DOCUMENTS

| | | | | |
|---|---|---|---|---|
| 5,123,107 A | * | 6/1992 | Mensch, Jr. .................... | 716/7 |
| 5,625,786 A | * | 4/1997 | Takahashi .................... | 712/230 |
| 5,685,005 A | * | 11/1997 | Garde et al. ................. | 711/153 |
| 5,740,467 A | * | 4/1998 | Chmielecki et al. .......... | 710/56 |
| 5,796,996 A | * | 8/1998 | Temma et al. ............... | 710/260 |
| 5,848,247 A | * | 12/1998 | Matsui et al. ................ | 710/104 |
| 5,848,253 A | * | 12/1998 | Walsh et al. ................. | 710/308 |

OTHER PUBLICATIONS

Scholze, *Einführung in die Mikrocomputertechnik; Grundlagen Programmierung Schaltungstechnik*, pp. 34–37, B. G. Teubner, Stuttgart 1985.
Scholze, *Einführung in die Mikrocomputertechnik; Grundlagen Programmierung Schaltungstechnik*, pp. 274–277, B. G. Teubner, Stuttgart 1985.
Meiling and Fülle, *Mikroprozessoren und Mikrorechner; Hardware und Software*, pp. 193–197, Akademie–Verlag, Berlin 1988.

* cited by examiner

Primary Examiner—Xuan M. Thai
(74) Attorney, Agent, or Firm—Richard E. Backus

(57) ABSTRACT

A synchronous communication bus for transferring data between circuit modules (2), which are connected to the communication bus, having at least one data bus (1, 3), a control bus (4) and a bus control unit (5), whereby the circuit modules send an interrupt signal to the bus control unit (5) in order to request data or, respectively, to signal readiness to send data. A memory (6) for the intermediate storage of data is provided in each circuit module (2), whereby the memories (6) are connected to the data bus (1, 3) and the bus control unit (5) is provided for clearing defined memories (6) in order to direct data from selected memories (6) into the data bus (1, 3) or, respectively, from the data bus (1, 3) into the memories (6).

8 Claims, 4 Drawing Sheets

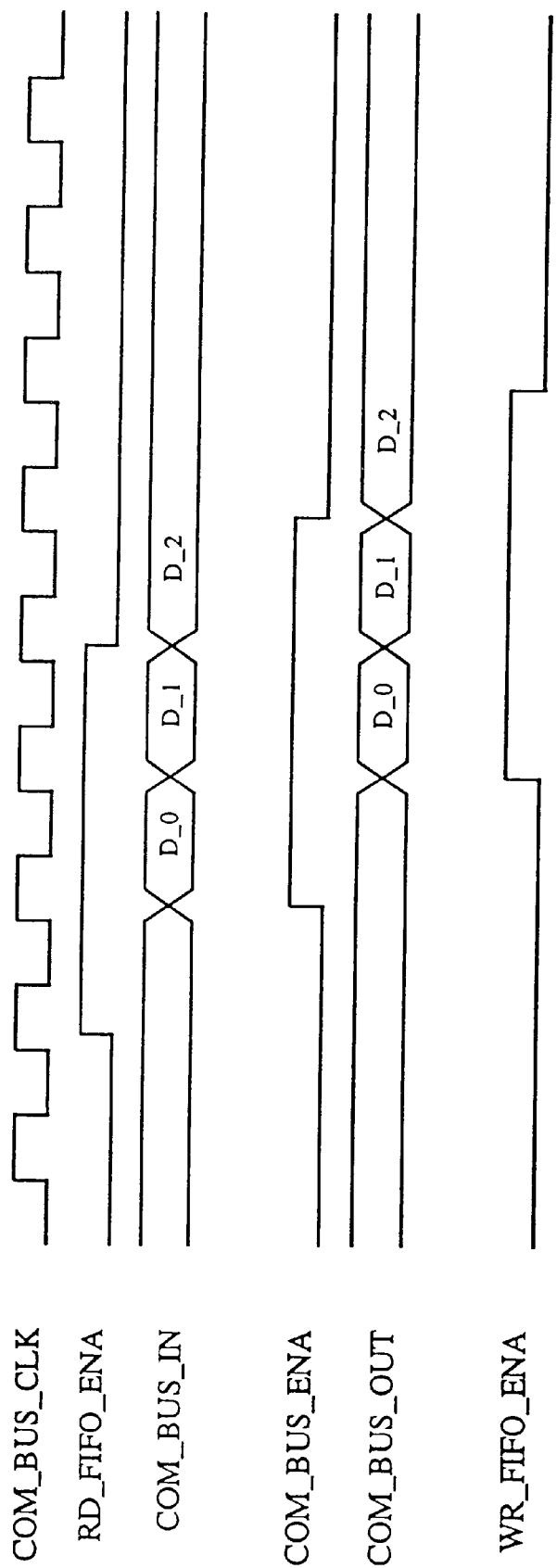

SYNCHRONOUS COMMUNICATION BUS AND PROCESS FOR SYNCHRONOUS COMMUNICATION BETWEEN CIRCUIT MODULES

This application mclaims priority of German patent application 199 29 419.4 filed Jun. 26, 1999.

BACKGROUND OF THE INVENTION

1. Field of the Invention

The invention relates to a synchronous communication bus for the transfer of data between circuit modules, which are connected to the communication bus. The communication bus is a register control bus comprising an address bus, a data bus and a control bus. The circuit modules either request data or, signal readiness to send an interrupt signal. Each circuit module comprises a synchronous register interface.

2. Description of the Related Art

Bus architectures for communication between circuit modules are especially adequately known from micro-computers. A typical system bus for a micro-computer is described in Scholze, Rainer: "EinfÅhrung in die Mikrocomputer-Technik: Grundlagen, Programmierung, Schaltungstechnik" [Introduction to micro-computer technology: principles, programming, circuit technology], Teubner-Studienskripten [Teubner study texts], Teubner-Verlag, Stuttgart, 1985, pages 34 through 37. A system bus comprises a data bus, an address bus and a control bus that are connected to and controlled by a micro-processor. Additional circuit modules, such as e.g. main memories, input/output channels, etc., are connected to the bus. Data from or, respectively, to the micro-processor are transferred bi-directionally via the data bus. The micro-processor transfers the current address to a circuit module, e.g. a memory address, the address of an input/output channel or address of of a supplementary component, via the address bus. The addresses are thereby cascaded so that part of the digital address can be used for the selection of the circuit module. Control signals, e.g. writing and reading signals, etc., are transferred to the control bus in order to trigger the circuit modules. The bus system is controlled by the micro-processor provided for establishing the addresses and control signals and for triggering the passive circuit modules connected to the bus.

In addition, multi-micro-processor systems are known in which several active micro-processors or, respectively, circuit modules have access to the system bus. A central bus allocation logic unit is thereby provided that controls the access to the system bus since only one circuit module can have access to the system bus at any one time. The bus allocation logic unit is also known as an interrupt-controller. The circuit modules send interrupt signals in order to request access to the system bus. The interrupt signals are controlled in terms of their priority and, depending on the priority of the interrupt signal, the circuit module in question receives information via the system bus in question for the duration of an exchange of data.

In Meiling, FÅlle: "Mikroprozessoren und Mikrorechner" [Micro-processors and micro-calculators], Akademie-Verlag, Berlin, 1988, pages 193 through 197, a communication bus is described that comprises a control bus, an address bus and a data bus in which the circuit modules each comprise a data buffer in the form of an intermediate memory and a programmable control register for communication with a central micro-processor. The circuit modules are provided for sending the interrupt signals to the central micro-processor that synchronizes the communication bus and controls the input/output operations of the circuit modules.

So-called DMA control elements are known for transferring large blocks of data from one circuit module to a memory element, in which a DMA controller is assisting bus control of the control elements without in-line hook up of the micro-processor. The DMA control element is described in Rainer Scholze, "EinfÅhrung in die Mikrocomputertechnik-Grundlagen, Programmierung, Schaltungstechnik" [Introduction to micro-computer technology-principles, programming, circuit technology], Teubner-Verlag, Stuttgart, 1985, pages 274 through 277. A DMA controller serves merely for controlling the communication of circuit modules with one single established memory component. A higher control of the communication bus takes place in addition to the DNA control of the circuit modules.

The problem presents itself during the development and programming of integrated circuits, which have been assembled in a modular fashion, of hooking up the modules in line with a bus system, which is as universal as is possible, in such a way that the bus is used to its full capacity as well and permits a high rate of data transmission via the bus. The control of the circuit modules has to be as simple as possible in this regard so that the communication bus is capable of being modified via simple programming. In addition, the circuit modules have to be capable of being synchronized without great expense.

OBJECTS AND SUMMARY OF THE INVENTION

In accordance with the invention, an additional data bus and additional control bus are provided beyond the conventional asynchronous processor bus systems comprising an address bus, a data bus and a control bus. A bus control unit synchronizes the control bus with an additional data bus, and the bus control unit has register interfaces which are triggered by clearing signals from the additional control bus. The conventional asynchronous processor bus system is merely used for controlling the circuit modules but not for controlling the transfer of data between the control modules.

A command memory can be provided in the bus control unit, whereby a table of command sequences is filed in the command memory. In this case, one command sequence can then be defined for each interrupt, whereby the command sequences comprise at least the memories that are to be selected, the number of data that are to be transferred and data for selection of a reading and writing mode. Thus the bus access by the bus control unit can be controlled automatically as a function of the interrupt. Reading out of data from defined circuit modules and writing of the data into other defined circuit modules, and/or the microprocessor is controlled by the command sequences. As a result, the bus can be adapted in a simple manner, via software, to the specific circuit requirements in question after the circuit modules have been hooked up in-line to the standard bus to give the desired circuit. A priority can thereby be established for every interrupt so that the implementation of the interrupt and/or the associated command sequences can take place in the sequential order of interrupt priorities. This has the advantage that the bus control unit can easily be modified subsequently by changing the priorities but without having to change the command sequences. This can be necessary, for example, when, during test operation, it is found that a memory is overflowing or, respectively, emptying out.

In accordance with the invention, the communication bus is synchronized via signals for clearing the memories by way of the feature that the clearing signals serve for supplying the communication bus with timing pulses. In addition, it is advantageous if the additional data bus has a reading data bus for reading data from a circuit module and a writing data bus for writing data into a circuit module. Data can then be written directly from one circuit module into another circuit module with the help of a pipeline procedure without further losses of timing pulses with the exception of the first and the last timing pulse. For this purpose, the invention provides an intermediate memory between the reading data bus and the writing data bus so that, in a first step, an item of data is first written into the intermediate memory via the reading data bus and, in a second step, it is written from the intermediate memory, via the writing data bus, into at least one other circuit module. The intermediate memory is advantageously a multiplexer. Multiplexing can be processed by means of a three state (tristate) bus.

A short command memory can be provided in the bus control unit and an interrupt line provided between the bus control unit and a micro-processor so that the micro-processor can write command sequences in the short command memory if an interrupt is sent to the micro-processor. As a result, command sequences, which are active on a short-term basis, can be established for the interrupts of the circuit modules. The bus control unit is also capable of being modified during operation in this way.

In addition, the micro-processor is connected to the circuit modules and is constructed in such a way that a degree of filling of the FIFO memories with data is established by the micro-processor, whereby an interrupt is sent on reaching the established degree of filling. As a result, the circuit modules can be controlled centrally via the micro-processor or, respectively, via a program that is implemented by the micro-processor by means of simple parametrization of the memories.

The synchronous communication bus offers good capacity utilization of the timing pulse cycles. As a result of the design of the communication bus, semiconductor circuits, which have been assembled in a modular fashion, can be developed and adapted with ease via conventional means.

BRIEF DESCRIPTION OF THE DRAWINGS

FIG. 4 is a timing diagram for the communication bus.

DESCRIPTION OF THE PREFERRED EMBODIMENTS

Figure 1:
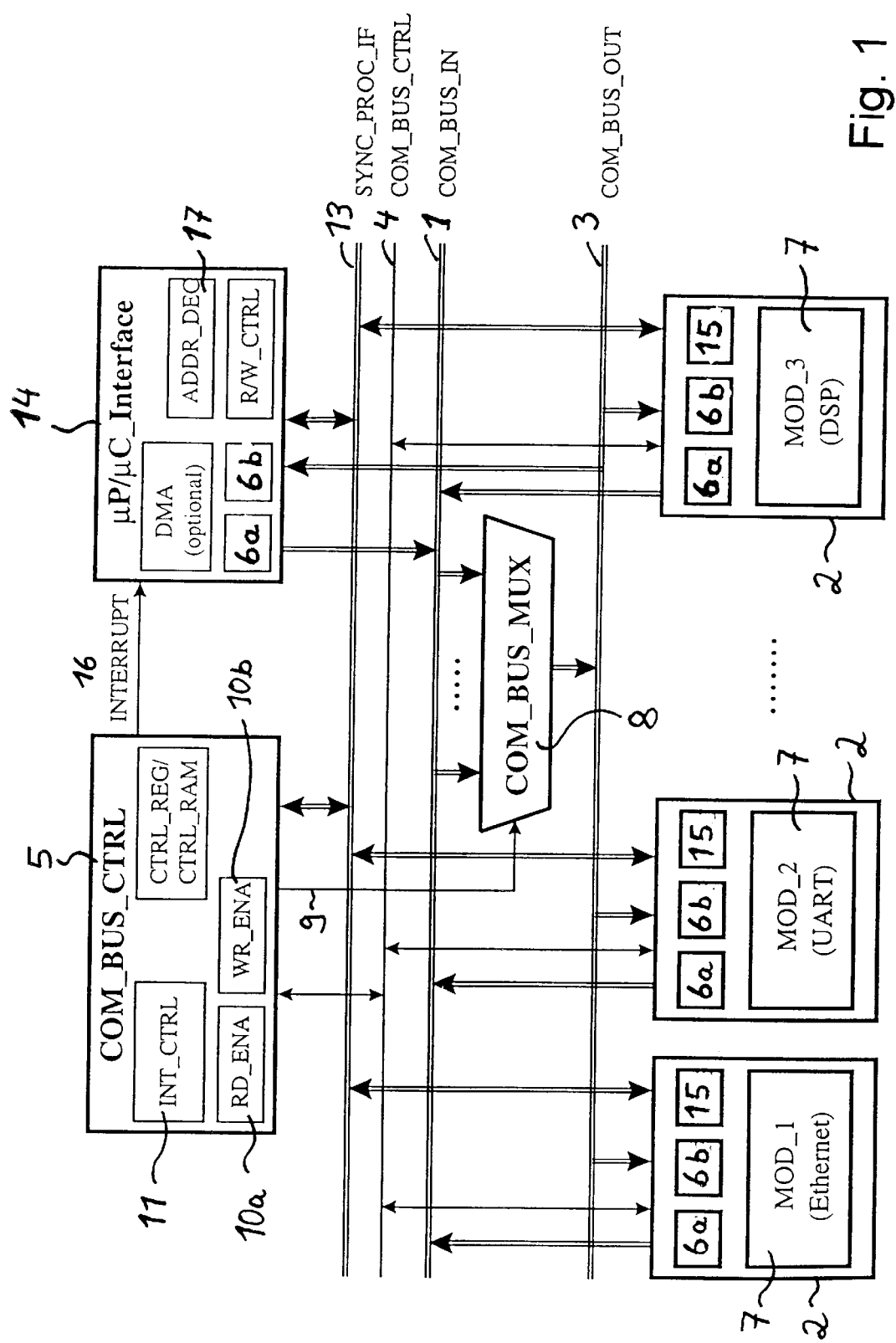
FIG. 1 is a block diagram illustrating the working circuit diagram of the synchronous communication bus.

FIG. 1 shows a block circuit diagram of a preferred embodiment of the synchronous communication bus. The communication bus comprises a reading data bus 1 for reading data from a circuit module 2 and a writing data bus 3 for writing data into a circuit module 2. In addition, a control bus 4 is provided to which the circuit modules 2 and a bus control unit 5 are connected. Interrupt signals are transferred from the circuit modules 2 to the bus control unit 5 via the control bus 4 and command sequences are transferred back from the bus control unit 5 to the circuit modules 2 via the control bus. The command sequences serve for selection and/or activation of FIFO memories (First-IN-First-OUT) 6. In addition, the control bus 4 establishes how much data per interrupt signal and/or per activation signal is sequentially transferred. In addition, the control bus 4 establishes whether reading from or, respectively, writing to the circuit modules 2 is taking place, i.e. it establishes a reading mode or a writing mode.

FIFO memories 6 are provided in the circuit modules 2, whereby a reading FIFO 6a and a writing FIFO 6b are present in each case. The circuit modules 2 additionally contain application circuits 7 for the implementation of defined applications such as e.g. ETHERNET-INTERFACE, UARTS, DIGITAL SIGNAL PROCESSORS (DSP), etc.

At least one intermediate memory 8 is provided between the reading data bus 1 and the writing data bus 3, whereby the intermediate memory can be constructed in the form of a multiplexer. The intermediate memory 8 is triggered by the bus control unit 5 via a control line 9 so that, in a first step, data can be written into the intermediate memory 8 from a circuit module 2 via the reading data bus 1 and, in a second step, they can be written from the intermediate memory 8, via the writing data bus 3, into at least one additional circuit module 2. If a sequence of data is transferred in this way, it is possible to read and write one item of data per timing pulse. A timing pulse for writing or, respectively, reading is not utilized merely at the start and at the end of a transfer cycle. The communication bus can be operated very effectively in this way.

The bus control unit 2 has elements 10a, 10b for clearing the FIFO memories 6a, 6b. Elements 10a, 10b are hereby provided for reading and writing, respectively. The bus control unit 5 also comprises an internal control circuit 11 as well as a command memory 12 in which command sequences for the interrupts are established and stored. The command memory 12 additionally comprises a short command memory in order to receive and store command sequences, which are capable of being activated on a short-lived basis, from a micro-processor 14 via a register control unit 13. The micro-processor 14 and the control register 15 of the circuit modules 2 are connected to the program bus 13.

The bus control unit 5 is connected to the micro-processor 14 via an interrupt line 16 so that a request for command sequences can be sent to the micro-processor 14 via an interrupt. Then the micro-processor 14 establishes command sequences, which are capable of being activated on a short-term basis, and files the command sequences in the short command memory. In this way, the micro-processor 14 can take over control via the communication bus. The micro-processor 14 comprises an address decoder 17 at its disposal for this purpose in order to send addresses to the control register 15 of the circuit modules 2 via the register control unit 13 and hence to permit controlled access to the circuit-modules 2 for data.

Access for data takes place in such a way in the case of the synchronous communication bus that an interrupt is sent from a circuit module 2 to the bus control unit 5 via the control bus 4. The bus control unit then establishes the priority of the interrupt and carries out the command sequences of the present interrupt arranged in accordance with priorities. For this purpose, signals for enabling reading and writing are sent to the FIFO memories 6a, 6b of the circuit modules 2. Then the circuit modules 2 shunt data from the reading FIFO 6a into the reading data bus 1 or, respectively, write data from the writing data bus 3 into the writing FIFO's 6b. The data cycles are transferred by the intermediate memory 8 so that the data is directed, in pipeline fashion, from the reading data bus 1 into the writing data bus 3.

Figure 2:
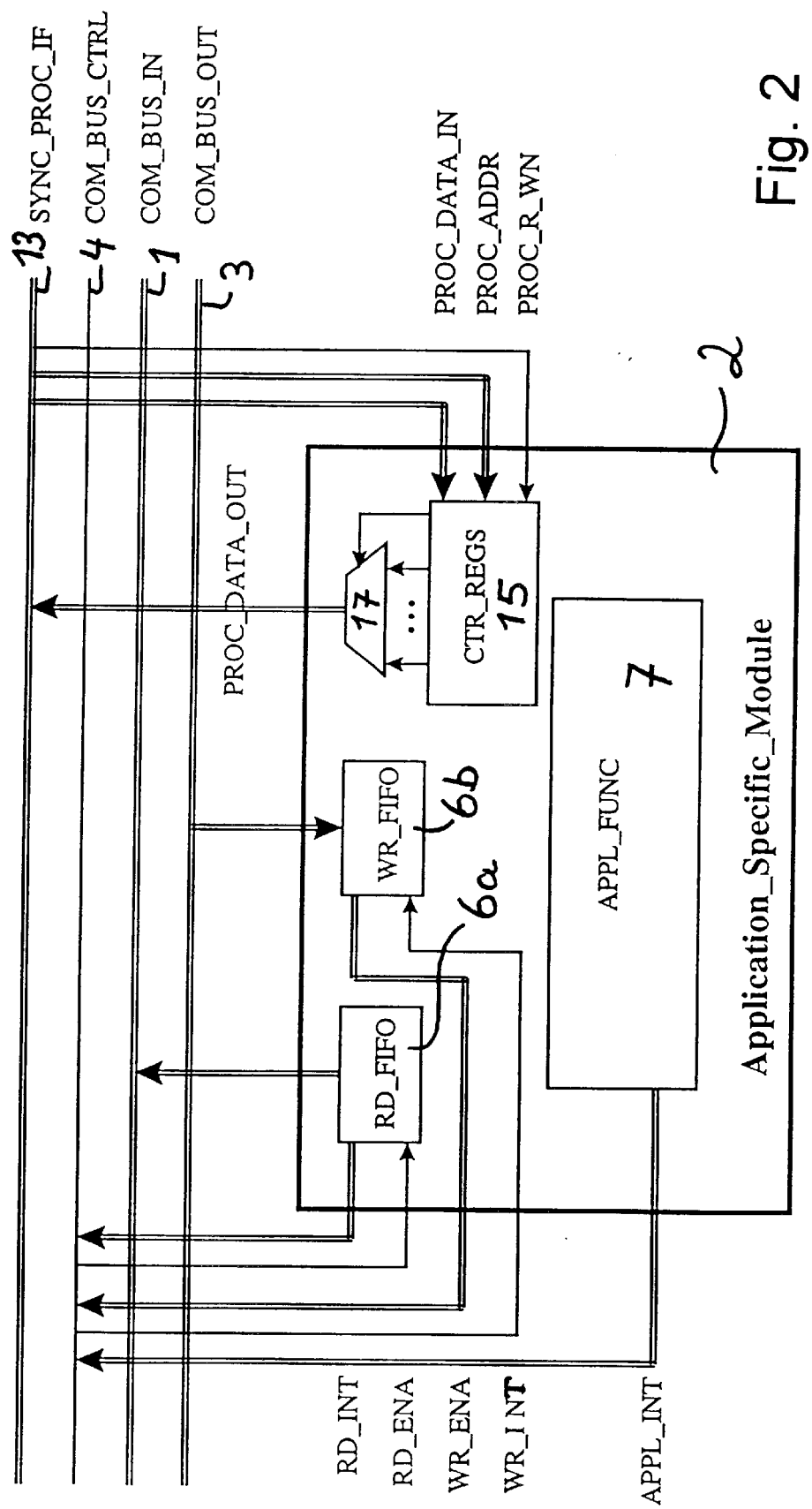
FIG. 2 is a block diagram illustrating the working circuit diagram of a circuit module with FIFO memories.

FIG. 2 shows a block circuit diagram of a circuit module 2. The circuit module 2 comprises an application circuit 7, i.e. an application function. In addition, FIFO memories 6a, 6b are provided, whereby a reading FIFO 6a is connected to the reading data bus 1 and a writing FIFO 6b is connected to the writing data bus 3. The FIFO memories 6a, 6b are connected via the control bus 4. The FIFO memories are also constructed in such a way that they are able to shunt interrupt signals into the control bus 4.

The circuit modules 2 also comprise control registers 15 in order to shunt control signals into the register control unit 13 via a multiplexer 17. The control register units 15 are triggered via the register control unit 13. Addresses PROC_ADDR, a reading/writing mode PROC_R_WN and program data PROC_DATA_IN are hereby transferred into the circuit modules 2 so that the circuit modules 2 can be controlled by aid of program data via the register control unit 13.

Figure 3:
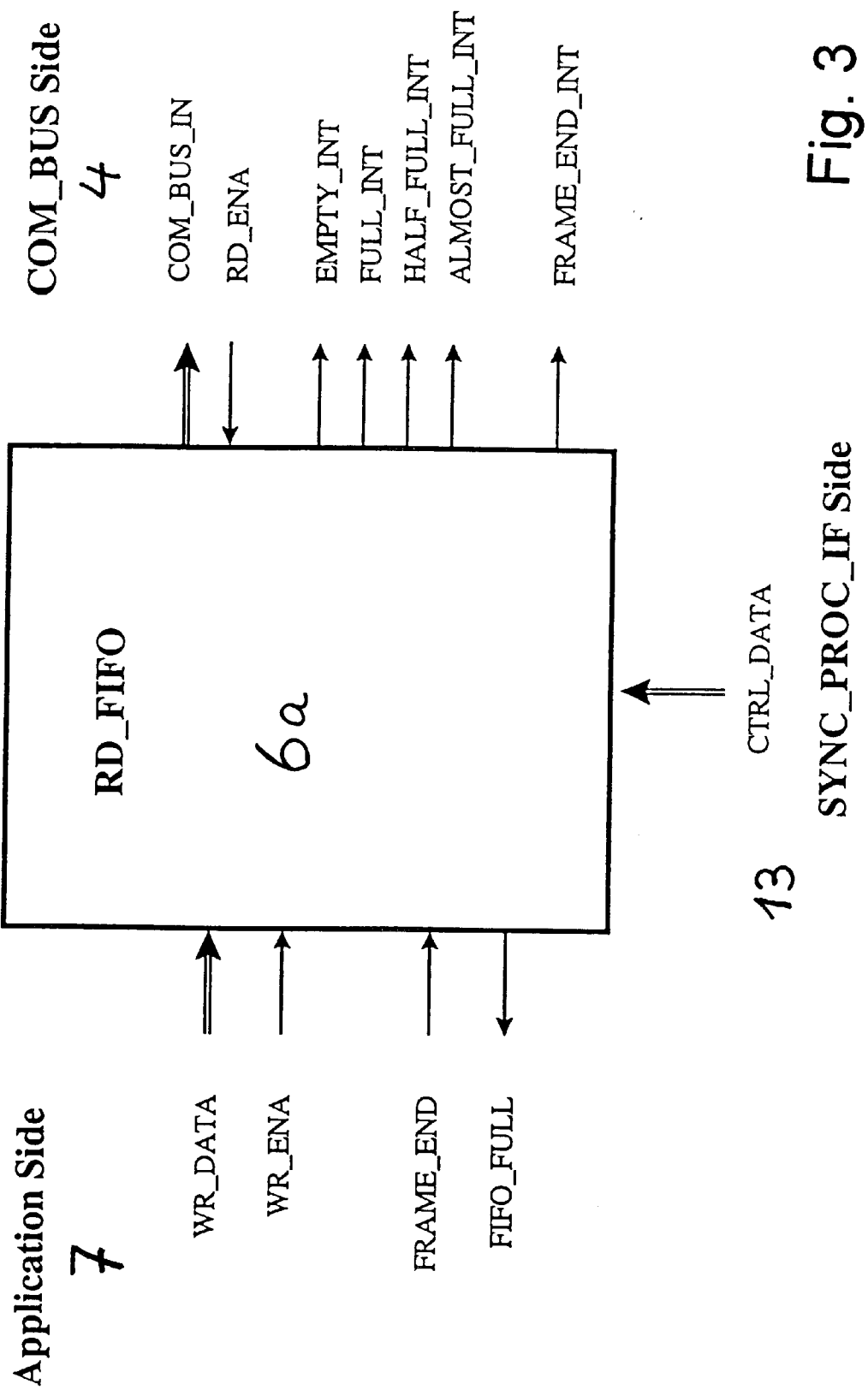
FIG. 3 is a block diagram illustrating output signals from a FIFO memory.

FIG. 3 shows a block circuit diagram of a FIFO memory 6 that is constructed in the form of a reading FIFO memory 6a. A data input WR_DATA is provided for data, which are written into the FIFO memory 6a, on the user side of the FIFO memory 6a. In addition, a writing enabling signal (WR-ENA) and a data signal (Frame End) are sent from the application circuit 7 to the FIFO memory 6a.

Control data (CTRL_DATA) is sent to the FIFO memory 6a via the program bus 13. The control data could be values of the filling levels of the memories, i.e. the values from the filling level register.

The FIFO memory 6a is connected to the communication bus via a data outlet connected to the reading data bus 1. Lines to the reading enabling unit (RD-ENA) and to the interrupt control unit are connected to the control bus 4. Interrupt control is carried out by several lines indicating a degree of filling of the FIFO memory 6a. These are signals indicating an empty FIFO memory 6a (Empty INT), a full FIFO memory 6a (Full INT), a half-full FIFO memory 6a ((half-full INT), and a virtually full FIFO memory 6a (almost full INT). In addition, a control signal is provided for the end of a data cycle (Frame End INT). Thus interrupt signals with varying priority can be sent via the control bus 4, whereby priority is established in the priority register in the bus control unit. The writing FIFO memory 6b is assembled similarly for this purpose.

FIG. 4 shows a timing diagram for the communication bus. The communication bus is supplied with timing impulses or, as the case may be, it is synchronized via a timing pulse signal. A reading FIFO memory 6a is cleared (RD_FIFO_ENA) in order to read out data from a circuit module 2. Data is then sent from the reading FIFO memory 6a to the reading data bus 1 (COM_BUS_IN). As soon as the data is sent to the reading data bus 1, a signal for clearing the intermediate memory 8 is sent from the bus control unit 5 to the intermediate memory 8 (COM_BUS_ENA). As a result of this, the data is stored in the intermediate memory 8 on an intermediate basis. After the first item of data D_0 has been stored on an intermediate basis, it is sent to the writing data bus 3 (COM_BUS_OUT) and is transferred with the help of a clearing signal for a writing FIFO memory 6b of a selected circuit module 2. The reading of data from a circuit module 2 takes place as long as the clearing signal (RD_FIFO_ENA) is being sent and the data is being written, in pipeline fashion, from the intermediate memory 8 into a circuit module 2 as long as a clearing signal (WR_FIFO_ENA) is also being sent there. It is possible, in this way, to transfer data continuously from a circuit module 2 to at least one additional circuit module 2 without losses in timing pulses. Several circuit modules 2 can also be triggered simultaneously in this way, so that data from the writing data bus 3 can be sent simultaneously from the writing data bus 3 to several circuit modules 2. As a result, an ATM switch (an asynchronous transfer mode switch) can be achieved, for example.

The communication bus is especially suitable for semiconductor circuits that have been assembled in a modular fashion and, in particular, for highly complex integrated systems with a plurality of circuit modules. The circuit modules 2 can be e.g. arithmetic co-processors, decoders such as e.g. audio-decoders and video-decoders, internal digital signal processors (DSP), ETHERNET interfaces, HDLC interfaces, Utopia interfaces, parallel interfaces, UARTS, etc.

What is claimed is:

1. A synchronous communication bus for the transfer of data, the communication bus comprising a conventional register control bus (13) comprising an address bus (PROC_ADDR), a data bus (PROC_DATA_IN) and a control bus (PROC_R_WN), a plurality of circuit modules (2) for requesting data and/or for signaling readiness to send an interrupt signal, each circuit module (2) comprising a synchronous register interface which is characterized in having an additional data bus (1, 3), an additional control bus (4) and a bus control unit (5), the register interfaces of the circuit modules (2) being connected to the data bus (1, 3) for exchanging the data, and the bus control unit (5) comprises a clearing unit, which is separate from a central micro-processor, for clearing the register interfaces of selected circuit modules (2) to enable the leading of data from selected circuit modules (2) into the data bus (1, 3) and/or from the data bus (1, 3) into the circuit modules (2), the communication bus being synchronized by the bus control unit (5) providing synchronizing signals which comprise the signals for clearing the register interface.

2. A synchronous communication bus in accordance with claim 1, and further characterized in that the bus control unit (5) comprises a command memory (12) for establishng and filing command sequences in the command memory (12) for the interrupt signals of the circuit modules (2), the command sequences comprising at least the memories (6) which are to be selected, the number of data which are to be transferred, and a reading mode and a writing mode.

3. A synchronous communication bus in accordance with claim 1 or 2, and further characterized in that the additional data bus (1, 3) comprises a reading data bus (1) for reading data from a circuit module (2) and a writing data bus (3) for writing data into a circuit module (2), and an intermediate memory (8) between the reading data bus (1) and the writing data bus (3) for transferring data from the reading data bus (1) to the writing data bus (3).

4. A synchronous communication bus in accordance with claim 1, characterized in that the additional data bus (1,3) comprises a reading data bus for reading data from a circuit module (2) and a writing data bus (3) for writing data into the circuit module, and an intermediate memory (8) comprising a multiplexer between the reading data bus and the writing data bus.

5. A synchronous communication bus in accordance with claim 1 which further comprises a bus control unit (5) having a short command memory which receives and stores command sequences which are capable of being activated on a short time basis.

6. A synchronous communication bus in accordance with claim 5, characterized by an interrupt line (16) between the bus control unit (5) and a micro-processor(14), whereby the micro-processor (14) writes command sequences in the short command memory responsive to an interrupt signal being sent from the bus control unit (5) to the micro-processor (14) to establish command sequences, which are active on a short time basis, for interrupts of the circuit modules (2).

7. A synchronous communication bus in accordance with claim 6 in which the micro-processor (14) and the circuit modules are enabled to establish the degrees of filling for the memories (6) via the data, whereby an interrupt is generated when the established degree of filling is reached.

8. A synchronous communication bus in accordance with claim 6 in which micro-processor (14) is enabled for changing the priorities for the interrupt signals.

* * * * *

UNITED STATES PATENT AND TRADEMARK OFFICE
CERTIFICATE OF CORRECTION

PATENT NO. : 6,678,766 B1
DATED : January 13, 2004
INVENTOR(S) : Feustel

It is certified that error appears in the above-identified patent and that said Letters Patent is hereby corrected as shown below:

<u>Title page,</u>
Item [73], Assignee, should read
-- Sci-Warx GmbH --

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,678,766 B1
DATED          : January 13, 2004
INVENTOR(S)    : Feustel It is certified that error appears in the above-identified patent and that said Letters Patent is hereby corrected as shown below:

<u>Title page,</u>
Item [73], Assignee, should read -- Sci-worx GmbH --

This certificate supersedes Certificate of Correction issued April 6, 2004.

Signed and Sealed this

Twenty-fifth Day of May, 2004

JON W. DUDAS
*Acting Director of the United States Patent and Trademark Office*